(12) United States Patent
Baek et al.

(10) Patent No.: US 12,344,699 B2
(45) Date of Patent: Jul. 1, 2025

(54) METHOD FOR HALOGENATING ISOBUTENE-ISOPRENE COPOLYMER

(71) Applicant: LG Chem, Ltd., Seoul (KR)

(72) Inventors: Jong Yeol Baek, Daejeon (KR); Moon Gon Jeong, Daejeon (KR); Gyeong Shin Choi, Daejeon (KR); Won Hee Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 526 days.

(21) Appl. No.: 17/913,325

(22) PCT Filed: Sep. 15, 2021

(86) PCT No.: PCT/KR2021/012584
§ 371 (c)(1),
(2) Date: Sep. 21, 2022

(87) PCT Pub. No.: WO2022/060084
PCT Pub. Date: Mar. 24, 2022

(65) Prior Publication Data
US 2023/0159673 A1    May 25, 2023

(30) Foreign Application Priority Data

Sep. 18, 2020  (KR) ......................... 10-2020-0120299
Sep. 18, 2020  (KR) ......................... 10-2020-0120663

(51) Int. Cl.
C08F 8/24      (2006.01)
C08F 8/22      (2006.01)
C08F 210/10    (2006.01)
C08F 236/08    (2006.01)

(52) U.S. Cl.
CPC ............... *C08F 8/24* (2013.01); *C08F 8/22* (2013.01); *C08F 210/10* (2013.01); *C08F 236/08* (2013.01)

(58) Field of Classification Search
CPC ...... C08F 8/20; C08F 8/22; C08F 8/24; C08F 210/12; C08F 210/10
See application file for complete search history.

(56) References Cited

U.S. PATENT DOCUMENTS

| | | | |
|---|---|---|---|
| 3,940,548 A | 2/1976 | Todani et al. | |
| 5,681,901 A | 10/1997 | Newman | |
| 5,883,198 A | 3/1999 | Kaszas et al. | |
| 6,043,384 A | 3/2000 | Fields, Jr. et al. | |
| 6,072,061 A | 6/2000 | Fields, Jr. et al. | |
| 6,204,338 B1 | 3/2001 | Kaszas et al. | |
| 6,232,409 B1 | 5/2001 | Kaszas et al. | |
| 6,420,489 B2 | 7/2002 | Kaszas et al. | |
| 9,657,158 B2 | 5/2017 | Leiberich et al. | |
| 2001/0008923 A1 | 7/2001 | Kaszas et al. | |
| 2008/0287559 A1 | 11/2008 | King et al. | |
| 2010/0298476 A1 | 11/2010 | Kulbaba et al. | |
| 2011/0184087 A1 | 7/2011 | Campomizzi et al. | |
| 2013/0131281 A1 | 5/2013 | Gronowski et al. | |
| 2013/0137832 A1 | 5/2013 | Kreuder et al. | |
| 2014/0221576 A1 | 8/2014 | Groemping et al. | |
| 2014/0309362 A1 | 10/2014 | Leiberich et al. | |
| 2015/0329700 A1 | 11/2015 | Leiberich et al. | |
| 2016/0222201 A1 | 8/2016 | Campomizzi et al. | |
| 2021/0130510 A1 | 5/2021 | Vora | |

FOREIGN PATENT DOCUMENTS

| | | |
|---|---|---|
| CN | 1356979 A | 7/2002 |
| CN | 101305022 A | 11/2008 |
| CN | 103562230 A | 2/2014 |
| CN | 103703034 A | 4/2014 |
| CN | 110229254 A | 9/2019 |
| JP | S58025337 A | 2/1983 |
| JP | S59226004 A | 12/1984 |
| JP | S59226005 A | 12/1984 |
| JP | S59226006 A | 12/1984 |
| JP | H02046042 B2 | 10/1990 |
| JP | H10045829 A | 2/1998 |
| JP | H10053615 A | 2/1998 |
| JP | 2009516019 A | 4/2009 |
| JP | 2013517362 A | 5/2013 |
| JP | 2020513055 A | 4/2020 |
| KR | 20000067939 A | 11/2000 |
| KR | 20010052247 A | 6/2001 |

(Continued)

OTHER PUBLICATIONS

RU2180337 English machine translation via Clarivate Analytics. (Year: 2025).*

(Continued)

*Primary Examiner* — Christopher M Rodd
(74) *Attorney, Agent, or Firm* — Lerner David LLP

(57) ABSTRACT

The present invention relates to a method for halogenating an isobutene-isoprene copolymer by using an organic hypochlorite. By using the method of the present invention, a hydrogen halide byproduct may be rapidly recycled into a halogenating agent and reused. As a result, a halogenated isobutene-isoprene copolymer having the high content of secondary allyl halogen functional groups may be prepared by increasing the participation ratio of the halogenating agent in reaction and suppressing the rearrangement of the secondary allyl halogen functional groups. The halogenated isobutene-isoprene copolymer prepared according to the present invention may be effectively used in the crosslinking reaction with other rubber, and is industrially useful.

16 Claims, No Drawings

(56) References Cited

FOREIGN PATENT DOCUMENTS

| KR | 20080066787 A | 7/2008 |
|----|---------------|--------|
| KR | 20100099125 A | 9/2010 |
| KR | 20120107137 A | 9/2012 |
| KR | 20140041860 A | 4/2014 |
| RU | 2180337 C1 * | 3/2002 |
| RU | 2320672 C1 | 3/2008 |
| RU | 2012107355 A | 9/2013 |

OTHER PUBLICATIONS

Extended European Search Report including Written Opinion for Application No. 21869706.8 dated Sep. 27, 2023, pp. 1-8.
Search Report dated Mar. 15, 2024 from the Office Action for Chinese Application No. 202180026008.3 Issued Mar. 21, 2024, pp. 1-3.
Zh. G. Grigoruk et al., Bromination of Butyl Rubber with a Sodium Bromide-tert-Butyl Hypochlorite System, Polymer Science, Series B, Dec. 2009, vol. 51, Nos. 11-12, pp. 497-500.
Wang Wei et al., Effects of Assistant Solvents and Mixing Intensity on the Bromination Process of Butyl Rubber, Chinese Journal of Chemical Engineering, Apr. 2014, vol. 22, No. 4, pp. 398-404.
International Search Report for PCT/KR2021/012584 mailed Dec. 27, 2021. 3 pgs.

\* cited by examiner

METHOD FOR HALOGENATING ISOBUTENE-ISOPRENE COPOLYMER

CROSS-REFERENCE TO RELATED APPLICATIONS

The present application is a national stage entry under 35 U.S.C. § 371 of International Application No. PCT/KR2021/012584 filed on Sep. 15, 2021, which claims priority from Korean Patent Applications No. 10-2020-0120299 filed on Sep. 18, 2020, and No. 10-2020-0120663 filed on Sep. 18, 2020, all the disclosures of which are incorporated herein by reference.

TECHNICAL FIELD

The present invention relates to a method for halogenating an isobutene-isoprene copolymer.

BACKGROUND ART

Butyl rubber (isobutene-isoprene rubber, IIR) is an isobutene-isoprene copolymer containing isobutene and about 1 to 6% of isoprene, and has excellent chemical resistance, humidity resistance, electrical insulation, or the like, and thus, is used as an adhesive composition, adhesive sheet, or the like. Isobutene that is the main component of butyl rubber shows excellent gas blocking, antioxidant, and thermal stability properties, but has no additional functional groups in a polymer chain and could not participate in crosslinking reaction. In order to compensate the defects, a certain amount of isoprene having unsaturated functional groups is included in the butyl rubber even after polymerization. However, butyl rubber has the small isoprene content, and still has defects of insufficient crosslinking reactivity.

In order to solve the defects, additional bromination reaction is performed to the double bond of the isoprene, and the butyl rubber is transformed into brominated butyl rubber, and the brominated butyl rubber is used after being crosslinked/compounded with other rubber. The brominated butyl rubber is characterized in not showing gas permeability, and accordingly, is widely used as the main material of the inner tube and inner liner of tires.

In the case of the bromination reaction, hydrogen bromide (HBr) is produced during the bromination process, and the ratio of practical bromination of the isobutene-isoprene copolymer in contrast to bromine molecules ($Br_2$) used in the bromination reaction is limited. In addition, hydrogen bromide that is a byproduct produced after the bromination reaction is required to be neutralized with a basic material, and according to the neutralization reaction, there are defects in that a large amount of an alkali metal bromide material is disposed and dissipated.

Conventionally, in order to improve a bromination degree in the bromination reaction of butyl rubber, an oxidant such as hydrogen peroxide was used for the purpose of oxidizing hydrogen bromide to bromine molecules again to participate in bromination reaction again. However, though using the bromine molecules again, a practical bromination degree in contrast to the injection amount of bromine molecules was insignificant. Accordingly, the development of a method for further improving the economic feasibility and efficiency of the bromination reaction is still required.

PRIOR ART DOCUMENT

[Patent Document]
Japanese Laid-open Patent No. 2020-513055

DISCLOSURE OF THE INVENTION

Technical Problem

An object of the present invention is to provide a method for preparing a halogenated isobutene-isoprene copolymer containing secondary allyl halogen functional groups having terminal double bonds in a high content, by suppressing the side reaction of rearranging secondary allyl halogen functional groups into primary allyl functional groups in a reaction for halogenating an isobutene-isoprene copolymer.

Technical Solution

In order to solve the above-described task, the present invention provides a method for halogenating an isobutene-isoprene copolymer, including: (S1) preparing a mixture solution including an isobutene-isoprene copolymer, an organic hypochlorite and a hydrocarbon solvent; and (S2) reacting the mixture solution with a halogenating agent to halogenate the isobutene-isoprene copolymer.

Advantageous Effects

By using the method of the present invention, a hydrogen halide byproduct may be rapidly recycled into a halogenating agent and reused. As a result, a halogenated isobutene-isoprene copolymer having the high content of secondary allyl halogen functional groups may be prepared by increasing the participation ratio of the halogenating agent in the reaction and suppressing the rearrangement of the secondary allyl halogen functional groups.

The halogenated isobutene-isoprene copolymer prepared according to the present invention may be effectively used in the crosslinking reaction with other rubber, and is industrially useful.

BEST MODE FOR CARRYING OUT THE INVENTION

Hereinafter, the present invention will be described in more detail in order to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The method for halogenating an isobutene-isoprene copolymer of the present invention is characterized in including: (S1) preparing a mixture solution including an isobutene-isoprene copolymer, an organic hypochlorite and a hydrocarbon solvent; and (S2) reacting the mixture solution with a halogenating agent to halogenate the isobutene-isoprene copolymer.

In the case of performing bromination reaction by reacting an isobutene-isoprene copolymer with a halogenating agent, for example, a brominating agent, a bromine atom is partially inserted into an isoprene repeating unit (structure I). Then, a part is present as the isoprene repeating unit itself, repeating units of secondary allyl bromide (structure II, exo-allylic bromide) and primary allyl bromide (structure III, endo-allylic bromide) are produced from the isoprene repeating unit, and hydrogen bromide (HBr) is produced as a byproduct.

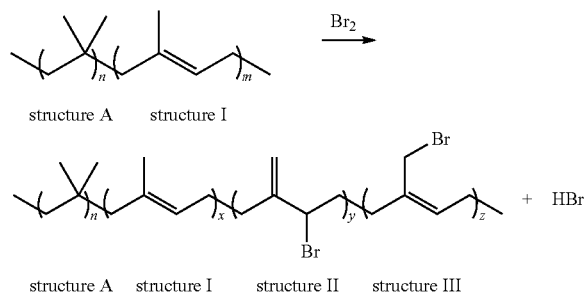

structure A    structure I structure A    structure I    structure II    structure III Though remaining in the mixture solution, hydrogen bromide may not participate in the bromination reaction as long as it is not transformed into another material, and may show toxicity. In the case of neutralizing the hydrogen bromide using a basic material to remove thereof, an alkali metal bromide material is produced, and there are problems of generating waste materials.

In addition, in the case where hydrogen bromide remains continuously in the solution, additional reaction with the isobutene-isoprene copolymer undergone bromination may arise. In this case, side reaction arising structural rearrangement from structure II to structure III may arise, and there may arise problems in that the brominated isobutene-isoprene copolymer comes to have undesired crosslinking properties. In order to maintain the crosslinking performance of the halogenated isobutene-isoprene copolymer constantly, it is important to prevent such structural rearrangement.

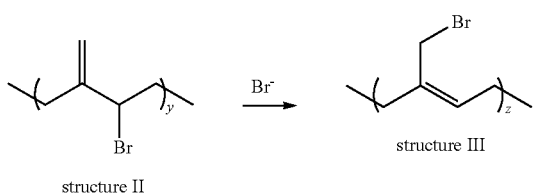

structure II    structure III

In order to suppress side effects and structural rearrangement, generated due to the remaining of hydrogen bromide, it is important to recycle hydrogen bromide into $Br_2$ that is a brominating agent again and use in the bromination reaction again. For this, an oxidant may be used together in a bromination reaction system. The oxidant oxidizes hydrogen bromide (HBr) into HOBr, and then, HOBr reacts with another hydrogen bromide molecule to be transformed into a bromine molecule. The bromine molecule thus formed may be used as the brominating agent again, to contribute to the increase of the efficiency of the bromination reaction.

$$HOBr + HBr \rightarrow Br_2 + H_2O$$

However, hydrogen peroxide, or the like, which is the conventionally used oxidant, has very low solubility in an organic layer, and is present in an aqueous layer in the mixture solution, while the isobutene-isoprene copolymer and the bromine molecules are present in the organic layer of the mixture solution, and hydrogen bromide produced therefrom also is present in the organic layer. Accordingly, in order that the oxidant makes contact and reacts with the hydrogen bromide, the hydrogen bromide is required to move to the aqueous layer. This inhibits the reaction of the oxidant and hydrogen bromide and acts as a factor of preventing the recycle of the hydrogen bromide into bromine molecules.

The inventors of the present invention studied to increase the bromination efficiency of the isobutene-isoprene copolymer and to further promote the recycle of hydrogen bromide into bromine molecules, and used an organic hypochlorite as an oxidant, which is easily dissolved in an organic layer. Through this, hydrogen bromide produced as a byproduct may contact the organic hypochlorite easily and rapidly to promote the regeneration reaction of hydrogen bromide. Through this, if the same amount of bromine molecules is used, bromine utilization (%) that represents the degree of practically participating and making bonds in the bromination reaction of bromine molecules with an isobutene-isoprene copolymer, may increase.

bromine utilization=(number of bromine atoms bonded to isobutene-isoprene copolymer)/(number of bromine atoms injected in bromination reaction)×100

Step (S1)

Step (S1) is a step of preparing a mixture solution including an isobutene-isoprene copolymer, an organic hypochlorite and a hydrocarbon solvent, and is to prepare a reactant for halogenation reaction.

In the present invention, the isobutene-isoprene copolymer may include 1 to 10 mol %, 1 to 8 mol %, or 1 to 5 mol %, or 1 to 3 mol % of an isoprene derived unit in contrast to the isobutene-isoprene copolymer, but a copolymer having a suitable composition or molecular weight may be selected according to the purpose or use and applied in the present invention, without limitation.

In the present invention, step (S1) may be performed by mixing an isobutene-isoprene copolymer and a hydrocarbon solvent to prepare an isobutene-isoprene copolymer solution (butyl rubber solution) first, and then mixing an organic hypochlorite. During preparing the butyl rubber solution, after mixing the isobutene-isoprene copolymer and the hydrocarbon solvent, a stirring step for sufficiently dissolving the isobutene-isoprene copolymer may be further performed.

In addition, step (S1) may include a step of mixing the isobutene-isoprene copolymer, the organic hypochlorite and the hydrocarbon solvent, and stirring for 10 seconds to 60 minutes, and the stirring time may be 10 seconds or more, 20 seconds or more, 30 seconds or more, 50 seconds or more, and 60 minutes or less, 30 minutes or less, 20 minutes or less, 10 minutes or less, 3 minutes or less.

For example, step (S1) may be performed by preparing a butyl rubber solution of a mixture of an isobutene-isoprene copolymer and a hydrocarbon solvent, preparing injecting an organic hypochlorite to prepare a mixture solution, and stirring for 10 seconds to 60 minutes.

As described above, by stirring in advance prior to reacting the mixture solution with a brominating agent to perform premixing, the dispersibility of the organic hypochlorite in the mixture solution may be reinforced. This assists more advantageous performance of the reaction of the organic hypochlorite with hydrogen bromide after the bromination reaction, and as a result, promotes the recycle of hydrogen bromide into bromine molecules to improve regeneration efficiency.

In the present invention, the organic hypochlorite may be a compound represented by Formula 1 below.

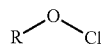

[Formula 1]

In Formula 1,

R is an alkyl group of 1 to 10 carbon atoms.

Particularly, R may be an alkyl group of 4 to 10 carbon atoms, and in view of securing stability to light exposure, carbon adjacent to the oxygen atom of Formula 1 may preferably be tertiary carbon. For example, R may be tert-butyl, tert-pentyl, 2-methylpentan-2-yl, 2,3-dimethylbutan-2-yl, 2-methylhexan-2-yl, 2,4-dimethylpentan-2-yl, 2,3-dimethylpentan-2-yl, 2,3,3-trimethylbutan-2-yl, or the like, without limitation.

In the present invention, the organic hypochlorite may be 0.1 to 2.0 equivalents, particularly, 0.1 equivalents or more, 0.2 equivalents or more, and 2.0 equivalents or less, 1.0 equivalent or less, 0.8 equivalents or less, 0.6 equivalents or less, less than 0.5 equivalents, 0.4 equivalents or less based on 1 equivalent of the halogenating agent. The halogenating agent may be, for example, a brominating agent.

If the organic hypochlorite is used in an excessive amount, the organic hypochlorite reacts with HCl to produce chlorine molecules ($Cl_2$), and this react with an unreacted isobutene-isoprene copolymer to induce side reactions which undergo chlorination.

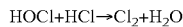

If chlorination arises partially instead of bromination, a chlorine-carbon bond has higher binding energy than a bromine-carbon bond and has inferior leaving capacity and reduced crosslinking rate, and crosslinking (vulcanization) properties of compounding agents after preparing rubber may change, and it is difficult to secure commercially required optimal physical properties. Accordingly, crosslinking to a target degree could not be achieved within the set time, and defects of deteriorating physical properties may arise.

Within the above-described range, the organic hypochlorite may sufficiently play the role as an oxidant of reducing the hydrogen bromide into the brominating agent, and bromide utilization or the bromination content of the brominated isobutene-isoprene may be significantly improved.

In the present invention, the mixture solution may include 15 wt % or less, or 10 wt % or less of water, preferably, less than 10 wt %, 5 wt % or less, 3 wt % or less, preferably, less than 1 wt % based on the total weight of the mixture solution.

The materials used as the conventional oxidants were water-soluble, and water was separately added to a mixture solution to form an emulsion. If water was not used, the oxidant was insufficiently dispersed in the mixture solution to reduce the reactivity with hydrogen bromide. Accordingly, a process for recycling hydrogen bromide into a brominating agent was not carried out well, and at last, there were defects of inducing the degradation of bromine utilization in the bromination reaction of the isobutene-isoprene copolymer. However, if water was used in the mixture solution, other defects of reducing the solubility of the isobutene-isoprene copolymer and increasing precipitation probability might arise, and both the improvement of the bromine utilization and the prevention of the precipitation of the isobutene-isoprene copolymer were difficult to achieve.

Meanwhile, the organic hypochlorite used as the oxidant in the present invention may be easily dissolved in an organic layer, and a separate emulsion is not required to form for the reaction with hydrogen bromide. Accordingly, water is not included except for the minimum water included as impurities in partial reactants in the mixture solution, and the water content in the mixture solution may be minimized. In the present invention, though water is not used in the mixture solution, there are no problems in the dispersibility of the organic hypochlorite, and the precipitation of the isobutene-isoprene copolymer may be prevented, while maintaining the bromine utilization to the same level.

In the present invention, the hydrocarbon solvent may be an aliphatic hydrocarbon solvent or an aromatic hydrocarbon solvent. For example, the aliphatic hydrocarbon solvent may be one or more selected from the group consisting of butane, pentane, neopentane, hexane, cyclohexane, methylcyclohexane, heptane and octane, and the aromatic hydrocarbon solvent may be one or more selected from the group consisting of benzene, toluene, xylene and ethylbenzene. More preferably, the hydrocarbon solvent may be hexane, without limitation.

In the present invention, the mixture solution may further include an alcohol.

Though reacting the hydrogen halide and the organic hypochlorite to recycle as a halogenating agent and use as described above, partial hydrogen halide still remains in an organic layer, and the possibility of inducing the rearrangement of structure II may not be completely removed. Accordingly, by further including an alcohol in the mixture solution, hydrogen halide which has not been recycled into the halogenating agent may be dissolved in an aqueous layer to prevent the physical contact with the halogenated isobutene-isoprene copolymer in an organic layer.

In addition, an alcohol but not water is used for forming the aqueous layer, and since the intrinsic pKa of oxonium ions is small, the ionization tendency of a hydrogen halide may be reduced together, and as a result, the number of halide ions may be reduced, and the structural rearrangement may be effectively suppressed.

As described above, it is important to promptly separate the hydrogen halide in a separate aqueous layer after halogenating the isobutene-isoprene copolymer and prior to performing additional reaction with the hydrogen halide. Accordingly, it is preferable that water is not separately added during the halogenation reaction, but an alcohol is injected into a reaction system in step (S1) before initiating halogenation.

In the present invention, the alcohol may be 0.1 to 20 parts by weight, particularly, 0.1 parts by weight or more, 0.5 parts by weight or more, 10 parts by weight or more, and 20 parts by weight or less, 15 parts by weight or less, based on 100 parts by weight of the hydrocarbon solvent.

Within the range, the alcohol sufficiently accomplishes the suppressing effects of byproducts, and the rearrangement of the isobutene-isoprene copolymer may be prevented, and the consumption of excessively large amount of energy during a drying process after finishing the halogenation reaction may be prevented without reducing economic feasibility.

In the present invention, the type of the alcohol is not that limited, but considering the easiness of drying after finishing the halogenation reaction of the isobutene-isoprene copolymer, the alcohol may be an alcohol of 1 to 4 carbon atoms, for example, methanol, ethanol, propanol, isopropyl alcohol, 1-butanol, 2-butanol, tert-butanol, or mixtures thereof.

Step (S2)

Step (S2) is a step of halogenating an isobutene-isoprene copolymer by reacting the mixture solution prepared in step (S1) with a halogenating agent, and in this case, a halogen atom is positioned at a hydrogen position of the isobutene-isoprene copolymer to produce a hydrogen halide as a byproduct.

In the present invention, the halogenating agent may be bromine molecules ($Br_2$) or chlorine molecules ($Cl_2$), particularly, bromine molecules ($Br_2$).

In the present invention, the halogenating agent may be 0.2 to 0.8 equivalents, particularly, 0.2 equivalents or more, 0.3 equivalents or more, 0.4 equivalents or more, and 0.8 equivalents or less, 0.7 equivalents or less, 0.6 equivalents or less, for example, 0.5 equivalents based on 1 equivalent of the isobutene-isoprene copolymer.

Within the above-range, the halogenation reaction of the isobutene-isoprene copolymer may be sufficiently performed, while suppressing the rather deterioration of the physical properties of the isobutene-isoprene copolymer due to the excessive amount of the remaining hydrogen halide not recycled.

In the present invention, the halogenating agent may be used by dissolving in a hydrocarbon solvent as a composition type, and the hydrocarbon solvent may be an aliphatic hydrocarbon solvent or an aromatic hydrocarbon solvent. For example, the aliphatic hydrocarbon solvent may be one or more selected from the group consisting of butane, pentane, neopentane, hexane, cyclohexane, methylcyclohexane, heptane and octane, and the aromatic hydrocarbon solvent may be one or more selected from the group consisting of benzene, toluene, xylene and ethylbenzene. More preferably, the hydrocarbon solvent may be hexane, without limitation.

The hydrocarbon solvent for dissolving the halogenating agent may be the same as or different from the hydrocarbon solvent used for the preparation of the mixture solution in step (S1), and preferably, hexane may be used likewise.

In the composition including the halogenating agent, the halogenating agent may be included in 10 wt % or more, 15 wt % or more, and 50 wt % or less, 30 wt % or less, for example, 20 wt % based on the composition, without limitation.

In the present invention, the halogenation in step (S2) may be performed at 10 to 80° C., 10° C. or more, 30° C. or more, 40° C. or more, and 80° C. or less, 60° C. or less, for example 40° C.

Within the range, the halogenation reaction of the isobutene-isoprene copolymer may be easily performed, while preventing the deterioration of the physical properties due to the increase of the amount of structure III in the halogenated isobutene-isoprene copolymer due to the excessive reaction of the halogenation.

In the present invention, the halogenation in step (S2) may be performed for 10 seconds to 60 minutes, particularly, 10 seconds or more, 30 seconds or more, 3 minutes or more, and 60 minutes or less, 30 minutes or less, 10 minutes or less, 7 minutes or less, for example 5 minutes.

Within the range, the halogenation reaction may be performed for a sufficient time, the halogenation degree of the isobutene-isoprene copolymer may be high, and the deterioration of physical properties may be prevented due to the increase of the amount of structure III in the halogenated isobutene-isoprene copolymer due to the excessive reaction of halogenation.

The present invention may further include (S3) a step of reacting with a basic material.

Though the above-described step (S2) is performed, partial hydrogen halide may still remain, and this may be reacted with a basic material to neutralize through acid-base reaction.

In the present invention, the basic material may use a material having pH 10 to 14, particularly, an alkali metal hydroxide, an alkaline earth metal hydroxide, an alkali metal carbonate, an alkaline earth metal carbonate, or the like, for example, potassium hydroxide, sodium hydroxide, calcium hydroxide, potassium carbonate, sodium carbonate, calcium carbonate, or the like, without limitation.

In the present invention, step (S3) may be performed at 10 to 40° C., particularly, 10° C. or more, 15° C. or more, 18° C. or more, and 40° C. or less, 30° C. or less, 25° C. or less, for example, 20° C. In addition, step (S3) may be performed for 3 minutes to 30 minutes, particularly, 3 minutes or more, 5 minutes or more, 7 minutes or more, and 30 minutes or less, 20 minutes or less, 15 minutes or less, for example, 10 minutes.

Under the temperature and time conditions, remaining hydrogen halide and unreacted halogenating agent may be removed through the reaction with the basic material to terminate the reaction and to prepare the halogenated isobutene-isoprene copolymer with high purity. If the reaction time of step (S3) is less than 3 minutes, the reaction may be insufficiently terminated, and unreacted halogenating agent may remain to be a risk of acting as a toxic material.

Meanwhile, since the organic hypochlorite is used as an oxidant to transform the hydrogen halide into the halogenating agent to reuse in the reaction in the present invention, the amount of the hydrogen halide remaining after the reaction is very small. Accordingly, an alkali metal halide produced through the reaction of the hydrogen halide and the basic material is small, and the time and cost required for disposing the alkali metal halide may be saved, and defects relating to toxicity may be solved.

EXAMPLES

Hereinafter, the present invention will be explained in more detail by embodiments. However, the embodiments below are only illustrations of the present invention, and the scope of the present invention is not limited thereto.

Example 1

0.5 g of an isobutene-isoprene copolymer (isoprene content=1.8 mol %) and 2.8 g of n-hexane were injected into a shaker and dissolved for 12 hours or more, and then stirred in a heating mantle adjusted to the reaction temperature of 40° C. for 30 minutes to prepare a butyl rubber solution. Then, 2.2 mg of a t-BuOCl organic hypochlorite (0.25 equivalents based on 1 equivalent of brominating agent) was injected as an oxidant to prepare a mixture solution. After that, stirring was performed for 1 minute to perform pre-mixing.

After finishing the premixing, 0.08 mL of a bromine solution (20 wt % solution in hexane) including 13.0 mg of a brominating agent of $Br_2$ (0.5 equivalents based on 1 equivalent of isobutene-isoprene copolymer) was injected into the mixture solution, and bromination reaction was performed at 40° C. for 5 minutes.

Then, 0.16 mL of a NaOH aqueous solution (1 M) was injected and neutralized at 20° C. for 10 minutes, and then, drying was performed in a vacuum oven to prepare a brominated isobutene-isoprene copolymer.

Example 2

A brominated isobutene-isoprene copolymer was prepared by the same method as in Example 1 except for not performing the premixing.

Example 3

A brominated isobutene-isoprene copolymer was prepared by the same method as in Example 1 except for additionally including 0.28 g (10 parts by weight based on 100 parts by weight of hexane) of water in the mixture solution.

Example 4

A brominated isobutene-isoprene copolymer was prepared by the same method as in Example 1 except for additionally including 0.28 g (10 parts by weight based on 100 parts by weight of hexane) of water in the mixture solution and not performing the premixing.

Example 5

A brominated isobutene-isoprene copolymer was prepared by the same method as in Example 1 except for additionally using 4.4 mg (0.50 equivalents based on 1 equivalent of brominating agent) of a t-BuOCl organic hypochlorite as an oxidant.

Example 6

A brominated isobutene-isoprene copolymer was prepared by the same method as in Example 1 except for additionally including 0.28 g (10 parts by weight based on 100 parts by weight of hexane) of water in the mixture solution and using 4.4 mg (0.50 equivalents based on 1 equivalent of brominating agent) of a t-BuOCl organic hypochlorite as an oxidant.

Example 7

A brominated isobutene-isoprene copolymer was prepared by the same method as in Example 1 except for additionally injecting 0.28 g (10 parts by weight based on 100 parts by weight of hexane) of methanol in the mixture solution.

Example 8

A brominated isobutene-isoprene copolymer was prepared by the same method as in Example 1 except for additionally injecting 0.28 g (10 parts by weight based on 100 parts by weight of hexane) of ethanol in the mixture solution.

Example 9

A brominated isobutene-isoprene copolymer was prepared by the same method as in Example 1 except for additionally including 0.28 g (10 parts by weight based on 100 parts by weight of hexane) of isopropyl alcohol in the mixture solution.

Example 10

A brominated isobutene-isoprene copolymer was prepared by the same method as in Example 1 except for additionally including 0.14 g (5 parts by weight based on 100 parts by weight of hexane) of methanol in the mixture solution.

Comparative Examples 1 to 10

Brominated isobutene-isoprene copolymers were prepared by the same method as in Example 1 except for changing reaction conditions as shown in Table 1 below.

TABLE 1

| | Oxidant | | Alcohol (parts by weight based on 100 parts by weight of hexane) | Premixing or not | Water |
|---|---|---|---|---|---|
| | Type | Equivalent | | | |
| Example 1 | t-BuOCl | 0.25 | — | 1 min premix | <1% |
| Example 2 | t-BuOCl | 0.25 | — | — | <1% |
| Example 3 | t-BuOCl | 0.25 | — | 1 min premix | 10% |
| Example 4 | t-BuOCl | 0.25 | — | — | 10% |
| Example 5 | t-BuOCl | 0.50 | — | 1 min premix | <1% |
| Example 6 | t-BuOCl | 0.50 | — | 1 min premix | 10% |
| Example 7 | t-BuOCl | 0.25 | Ethanol (10 parts by weight) | 1 min premix | <1% |
| Example 8 | t-BuOCl | 0.25 | Methanol (10 parts by weight) | 1 min premix | <1% |
| Example 9 | t-BuOCl | 0.25 | Isopropyl alcohol (10 parts by weight) | 1 min premix | <1% |
| Example 10 | t-BuOCl | 0.25 | methanol (5 parts by weight) | 1 min premix | <1% |
| Comparative Example 1 | — | — | — | — | <1% |
| Comparative Example 2 | — | — | — | — | 10% |
| Comparative Example 3 | Hydrogen peroxide | 0.25 | — | — | 10% |
| Comparative Example 4 | Hydrogen peroxide | 0.50 | — | — | <1% |
| Comparative Example 5 | Hydrogen peroxide | 0.50 | — | — | 10% |
| Comparative Example 6 | NaOCl | 0.25 | — | — | <1% |
| Comparative Example 7 | NaOCl | 0.25 | — | — | 10% |
| Comparative Example 8 | NaOCl | 0.50 | — | — | 10% |
| Comparative Example 9 | NaOCl | 1.00 | — | — | 10% |
| Comparative Example 10 | NaOCl | 2.00 | — | — | 10% |

Experimental Example 1

According to the equation below, bromine utilization (%) practically used in the bromination reaction of bromine molecules injected was calculated.

bromine utilization (%)=(number of bromine atoms bonded to isobutene-isoprene copolymer)/(number of bromine atoms injected in bromination reaction)×100

TABLE 2

| | Bromine utilization (%) |
|---|---|
| Example 1 | 56 |
| Example 2 | 48 |
| Example 3 | 57 |
| Example 4 | 49 |
| Example 5 | 60 |
| Example 6 | 61 |
| Example 7 | 56 |
| Example 8 | 57 |
| Example 9 | 57 |
| Example 10 | 56 |
| Comparative Example 1 | 30 |
| Comparative Example 2 | 30 |
| Comparative Example 3 | 36 |
| Comparative Example 4 | 36 |
| Comparative Example 5 | 40 |
| Comparative Example 6 | 27 |
| Comparative Example 7 | 35 |
| Comparative Example 8 | 40 |
| Comparative Example 9 | 43 |
| Comparative Example 10 | 44 |

The bromination utilization expresses the degree of a compound practically being inserted into the isobutene-isoprene copolymer and arising the bromination among the compound used as the brominating agent, and means that if the bromination utilization increases, the bromination of the isobutene-isoprene copolymer may be increased to a higher level with the same amount of the brominating agent. In the cases of Examples 1 to 10, in which the isobutene-isoprene copolymers were brominated according to the method suggested in the present invention, the higher bromination utilization was confirmed in contrast to Comparative Examples 1 and 2, in which an oxidant was not used, Comparative Examples 3 to 5, in which hydrogen peroxide was used as an oxidant, and Comparative Examples 6 to 10, in which a metal hypochlorite was used.

Particularly, in the case of using the metal hypochlorite as the oxidant, two times or more equivalents of the oxidant was used in Comparative Examples 8 to 10 in contrast to Example 4, but the degree of practically inserted bromine fell behind, and the bromination utility was inferior.

In addition, Examples 1 to 3, in which the organic hypochlorite was injected, and the premixing was performed, undergone the reaction of the organic hypochlorite and hydrogen bromide more actively to increase regeneration efficiency, and showed improved bromination utility in contrast to Examples 2 and 4, in which the premixing was omitted.

In addition, in the case of using the organic hypochlorite as the oxidant, the water content may be minimized, and the bromination utilization of Examples 1 and 3, and that of Examples 2 and 4 are shown the same. On the contrary, when comparing Comparative Examples 4 and 5, with Comparative Examples 6 and 7, it could be found that Comparative Examples 4 and 6 showed inferior bromination utilization in contrast to Comparative Examples 5 and 7, respectively.

Experimental Example 2

With respect to the brominated isobutene-isoprene copolymers of the Examples and Comparative Examples, the ratio of inner structure was calculated through $^1$H NMR (CDCl$_3$) analysis.

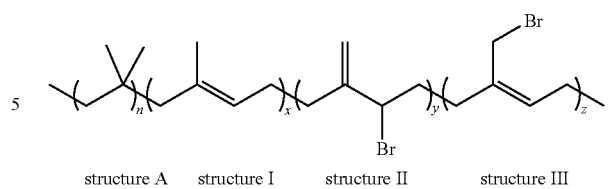

structure A    structure I    structure II    structure III (1) Structure I (Isoprene Repeating Unit) Content (Mol %)

structure I content (mol %)=[(structure I mole number)/(structure A mole number+structure I mole number+structure II mole number+structure III mole number)]×100

The structure I content (mol %) represents the ratio of isoprene repeating units remaining intactly, in which bromine is not inserted in one strand of an isobutene-isoprene copolymer chain.

(2) Bromination content (mol %)

bromination content (%)=[(structure II mole number+structure III mole number)/(structure A mole number+structure I mole number+structure II mole number+structure III mole number)]×100

The bromination content (mol %) represents the ratio of bromine-inserted repeating units in one strand of an isobutene-isoprene copolymer chain, and is an index representing the degree of the progress of the bromination reaction with respect to the isobutene-isoprene copolymer.

(3) Chlorination Content (Mol %)

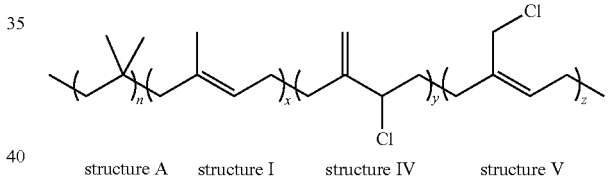

structure A    structure I    structure IV    structure V chlorination content (mol %)=[(structure IV mole number+structure V mole number)/(structure A mole number+structure I mole number+structure II mole number+structure III mole number)]×100

The chlorination content (mol %) represents the ratio of chlorine-inserted repeating units in one strand of an isobutene-isoprene copolymer chain.

(4) Structure II ratio (%)

structure II ratio (%)=[(structure II mole number)/(structure II mole number+structure III mole number)]×100

The structure II ratio (%) represents the ratio of structure II among the brominated repeating units (structure II and structure III).

TABLE 3

| | Structure I content (mol %) | Bromination content (mol %) | Chlorination content (mol %) | Structure II ratio (%) |
|---|---|---|---|---|
| Example 1 | 0.77 | 1.02 | <0.05 | 90 |
| Example 2 | 0.92 | 0.87 | <0.05 | 91 |
| Example 3 | 0.76 | 1.03 | <0.05 | 90 |

TABLE 3-continued

| | Structure I content (mol %) | Bromination content (mol %) | Chlorination content (mol %) | Structure II ratio (%) |
|---|---|---|---|---|
| Example 4 | 0.90 | 0.89 | <0.05 | 90 |
| Example 5 | 0.46 | 1.08 | 0.25 | 91 |
| Example 6 | 0.45 | 1.10 | 0.25 | 90 |
| Example 7 | 0.55 | 0.97 | <0.05 | 98 |
| Example 8 | 0.53 | 0.96 | <0.05 | 97 |
| Example 9 | 0.57 | 0.94 | <0.05 | 98 |
| Example 10 | 0.58 | 0.94 | <0.05 | 98 |
| Comparative Example 1 | 1.20 | 0.60 | — | 73 |
| Comparative Example 2 | 1.18 | 0.61 | — | 92 |
| Comparative Example 3 | 1.11 | 0.68 | — | 92 |
| Comparative Example 4 | 1.10 | 0.69 | — | 91 |
| Comparative Example 5 | 1.03 | 0.77 | — | 90 |
| Comparative Example 6 | 1.25 | 0.53 | <0.05 | 90 |
| Comparative Example 7 | 1.15 | 0.64 | <0.05 | 90 |
| Comparative Example 8 | 1.08 | 0.70 | <0.05 | 91 |
| Comparative Example 9 | 0.90 | 0.74 | 0.15 | 85 |
| Comparative Example 10 | 0.74 | 0.75 | 0.30 | 78 |

In Examples 1 to 10, isobutene-isoprene copolymers having higher bromination content in contrast to the Comparative Examples could be prepared, and this means that brominated isobutene-isoprene copolymers having excellent crosslinking performance could be prepared by using the organic hypochlorite as an oxidant.

Particularly, Example 4 using t-BuOCl as an oxidant showed higher bromination content in contrast to Comparative Example 3 using the same equivalent of hydrogen peroxide as an oxidant. In addition, it was confirmed that Examples 2 and 4 using t-BuOCl as an oxidant showed higher bromination contents in contrast to Comparative Examples 6 and 7 using the same equivalent of NaOCl as an oxidant, respectively.

In addition, among the Examples, Examples 1 and 3, in which premixing was performed, showed higher bromination contents in contrast to Examples 2 and 4, omitting the premixing. Meanwhile, in Examples 5 and 6, the oxidant equivalent was the highest, and the bromination content was the largest. However, it could be found that partial chlorination reaction was performed at the same time due to the excessive amount of the oxidant, and the chlorination content was increased.

Since t-BuOCl used in the Examples was dispersed well in the mixture solution without emulsification, the bromination contents were shown excellent to the similar degree when comparing Examples 1 and 3, and Examples 2 and 4, using different water contents, and in Examples 1 and 2, in which the water content was less than 1%, no precipitation of the isobutene-isoprene copolymer was observed. On the contrary, the oxidant of the Comparative Examples was difficult to disperse in the mixture solution without using water separately, and the bromination content was low in Comparative Example 4 in which NaOCl was used, and the water content was less than 1% in contrast to Comparative Example 5, and the bromination content was low in Comparative Example 6 in which the water content was less than 1% in contrast to Comparative Example 7. Meanwhile, in Comparative Example 5 and Comparative Example 7, the bromination utilization was somewhat increased due to the addition of water, but the production of the precipitation of the isobutene-isoprene copolymer was observed with the naked eye.

Meanwhile, in the cases of Examples 6 to 10, t-BuOCl was used as the oxidant and at the same time, an alcohol was injected into the mixture solution, and the suppressing effects of the rearrangement of structure II were shown even better, to prepare a brominated isobutene-isoprene copolymer having a very high structure II ratio.

Through the results, it could be confirmed that a brominated isobutene-isoprene copolymer having the high bromination content could be prepared by using an organic hypochlorite as an oxidant according to the preparation method of the present invention, and by controlling the reaction conditions, optimal bromination reaction could be performed.

The invention claimed is:

1. A method for halogenating an isobutene-isoprene copolymer, the method comprising:
   (S1) preparing a mixture solution comprising an isobutene-isoprene copolymer, an organic hypochlorite and a hydrocarbon solvent; and
   (S2) reacting the mixture solution with a halogenating agent to halogenate the isobutene-isoprene copolymer.

2. The method for halogenating an isobutene-isoprene copolymer according to claim 1, wherein the organic hypochlorite is a compound represented by the following Formula 1:

[Formula 1]

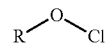

in Formula 1,
R is an alkyl group of 1 to 10 carbon atoms.

3. The method for halogenating an isobutene-isoprene copolymer according to claim 2, wherein, in Formula 1,
R is an alkyl group of 4 to 10 carbon atoms, and
carbon adjacent to an oxygen atom in Formula 1 is tertiary carbon.

4. The method for halogenating an isobutene-isoprene copolymer according to claim 2, wherein, in Formula 1, R is tert-butyl, tert-pentyl, 2-methylpentan-2-yl, 2,3-dimethylbutan-2-yl, 2-methylhexan-2-yl, 2,4-dimethylpentan-2-yl, 2,3-dimethylpentan-2-yl, or 2,3,3-trimethylbutan-2-yl.

5. The method for halogenating an isobutene-isoprene copolymer according to claim 1, wherein step (S1) comprises mixing the isobutene-isoprene copolymer, the organic hypochlorite and the hydrocarbon solvent and stirring for 10 seconds to 60 minutes.

6. The method for halogenating an isobutene-isoprene copolymer according to claim 1, wherein the mixture solution comprises 15 wt % or less of water based on a total weight of the mixture solution.

7. The method for halogenating an isobutene-isoprene copolymer according to claim 1, wherein the organic hypochlorite is 0.1 to 2.0 equivalents based on 1 equivalent of the halogenating agent.

8. The method for halogenating an isobutene-isoprene copolymer according to claim 1, wherein the halogenating agent is 0.2 to 0.8 equivalents based on 1 equivalent of the isobutene-isoprene copolymer.

9. The method for halogenating an isobutene-isoprene copolymer according to claim 1, further comprising (S3) reacting with a basic material after step (S2).

10. The method for halogenating an isobutene-isoprene copolymer according to claim 9, wherein step (S3) is performed at 10 to 40° C. for 3 minutes to 30 minutes.

11. The method for halogenating an isobutene-isoprene copolymer according to claim 1, wherein the halogenating agent is a bromine molecule ($Br_2$) or a chlorine molecule ($Cl_2$).

12. The method for halogenating an isobutene-isoprene copolymer according to claim 1, wherein the mixture solution further comprises an alcohol.

13. The method for halogenating an isobutene-isoprene copolymer according to claim 12, wherein the alcohol is one or more selected from the group consisting of methanol, ethanol, propanol, isopropyl alcohol, 1-butanol, 2-butanol and tert-butanol.

14. The method for halogenating an isobutene-isoprene copolymer according to claim 12, wherein the alcohol is 0.1 to 20 parts by weight based on 100 parts by weight of the hydrocarbon solvent.

15. The method for halogenating an isobutene-isoprene copolymer according to claim 12, wherein the alcohol is injected into the mixture solution in step (S1) before initiating halogenation.

16. The method for halogenating an isobutene-isoprene copolymer according to claim 1, wherein the halogenation in step (S2) is performed at 10 to 80° C. for 10 seconds to 60 minutes.

* * * * *